(12) United States Patent
Kim

(10) Patent No.: US 7,906,050 B2
(45) Date of Patent: Mar. 15, 2011

(54) METHOD OF MANUFACTURING A BACK PLATE AND A SEAT PLATE AND A WHEELCHAIR HAVING THE SAME

(75) Inventor: Sung Lae Kim, Seoul (KR)

(73) Assignee: Eugene Medicare Co., Ltd, Seoul (KR)

( * ) Notice: Subject to any disclaimer, the term of this patent is extended or adjusted under 35 U.S.C. 154(b) by 727 days.

(21) Appl. No.: 11/816,277

(22) PCT Filed: Jan. 17, 2007

(86) PCT No.: PCT/KR2007/000286
§ 371 (c)(1),
(2), (4) Date: Aug. 14, 2007

(87) PCT Pub. No.: WO2007/094569
PCT Pub. Date: Aug. 23, 2007

(65) Prior Publication Data
US 2008/0157417 A1    Jul. 3, 2008

(30) Foreign Application Priority Data

Feb. 13, 2006  (KR) .................. 10-2006-0013685
Dec. 22, 2006  (KR) .................. 10-2006-0132759

(51) Int. Cl.
*B29C 67/00* (2006.01)

(52) U.S. Cl. ............... 264/46.4; 264/46.5; 264/45.1; 264/45.2; 264/220; 264/222; 264/224; 264/225; 280/250.1; 280/304.1; 296/65.04; 5/653; 5/655.9

(58) Field of Classification Search ............ 264/46.4, 264/46.5, 45.1, 45.2, 220, 222, 224, 225; 280/250.1, 304.1; 296/65.04; 5/653, 655.9
See application file for complete search history.

(56) References Cited

U.S. PATENT DOCUMENTS 3,830,896 A * 8/1974 Flicker et al. ............. 264/45.2
5,643,513 A * 7/1997 Searle ...................... 264/46.5

OTHER PUBLICATIONS

WIPO, International Search Report for PCT/KR2007/000286.

* cited by examiner

*Primary Examiner* — Jeffrey Wollschlager
*Assistant Examiner* — Stella Yi
(74) *Attorney, Agent, or Firm* — Intellectual Property Law Group LLP; Juneko Jackson; Otto O. Lee

(57) ABSTRACT

The present invention relates to a wheelchair having a back plate and a seat plate and a manufacturing method thereof, and more particularly, to a customized wheelchair having a back plate and a seat plate formed to fit a body shape and a manufacturing method thereof. In a method of manufacturing a customized wheelchair having a back plate and a seat plate which are designed to fit a body shape, the method includes steps of: forming a preliminary molding material which is directly formed to fit a back and a hip of a user; fixing the preliminary molding material to a molding frame; filling a foaming resin in the molding frame fixed with the preliminary molding material; hardening the foaming resin filled in the molding frame; and releasing a last molding material which is foamed and hardened to have a shape of the back and the hip of the user by the preliminary molding material. Accordingly, the customized wheelchair, which has the back plate and the seat plate having the exactly same shape as the body shape of the user, can be manufactured by those ordinary skilled in the art in a cost effective manner.

8 Claims, 3 Drawing Sheets

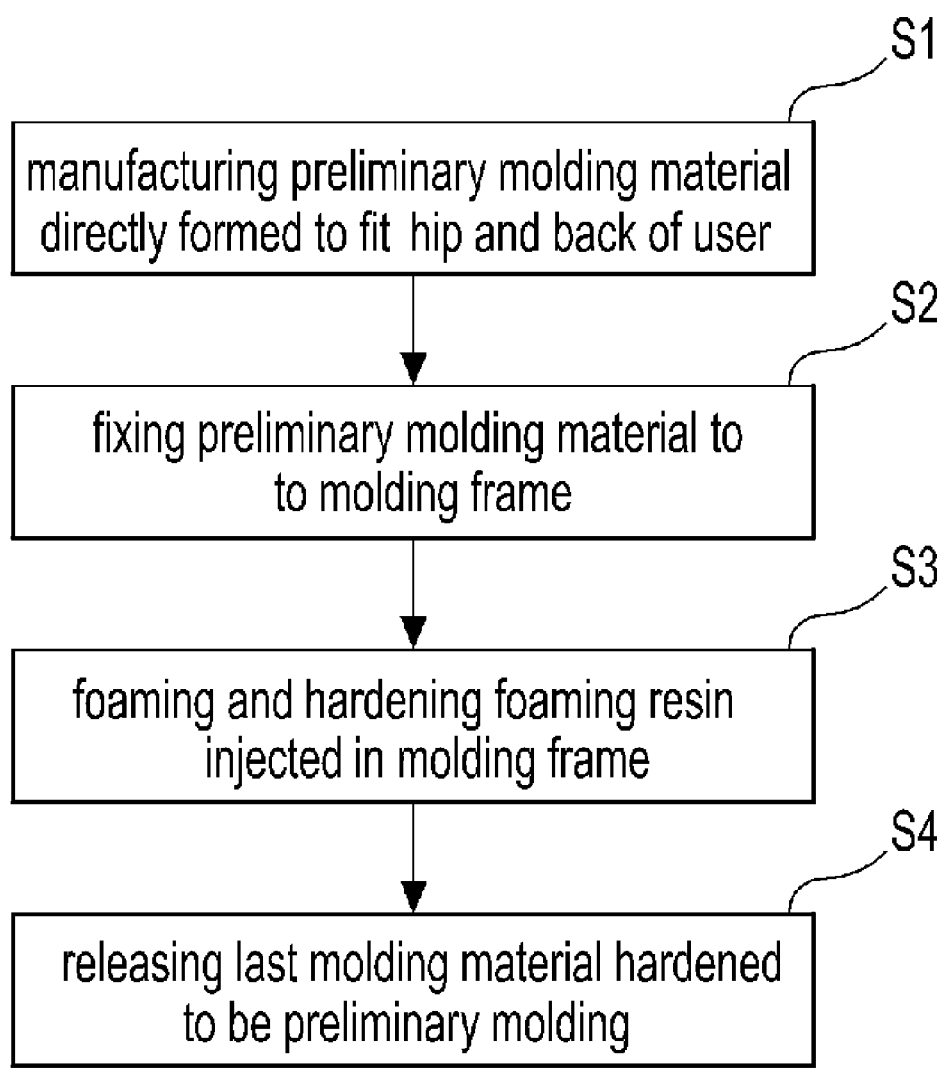

[Fig. 2]
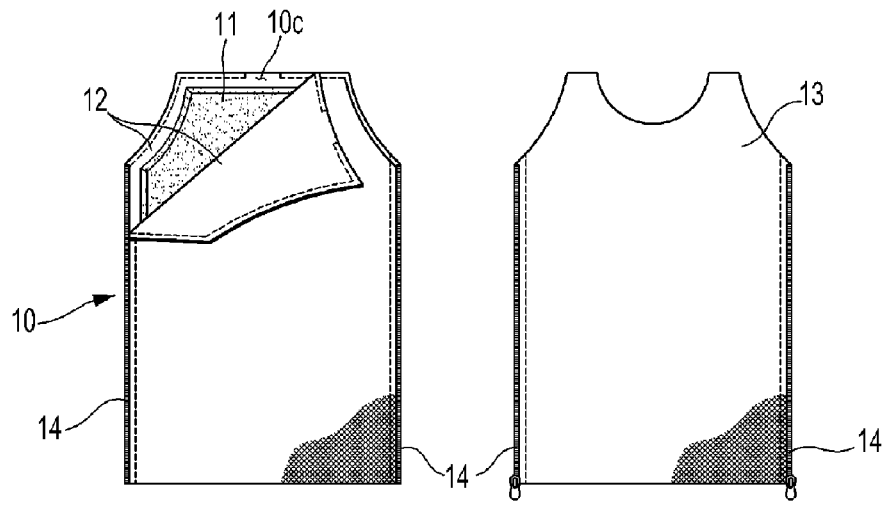
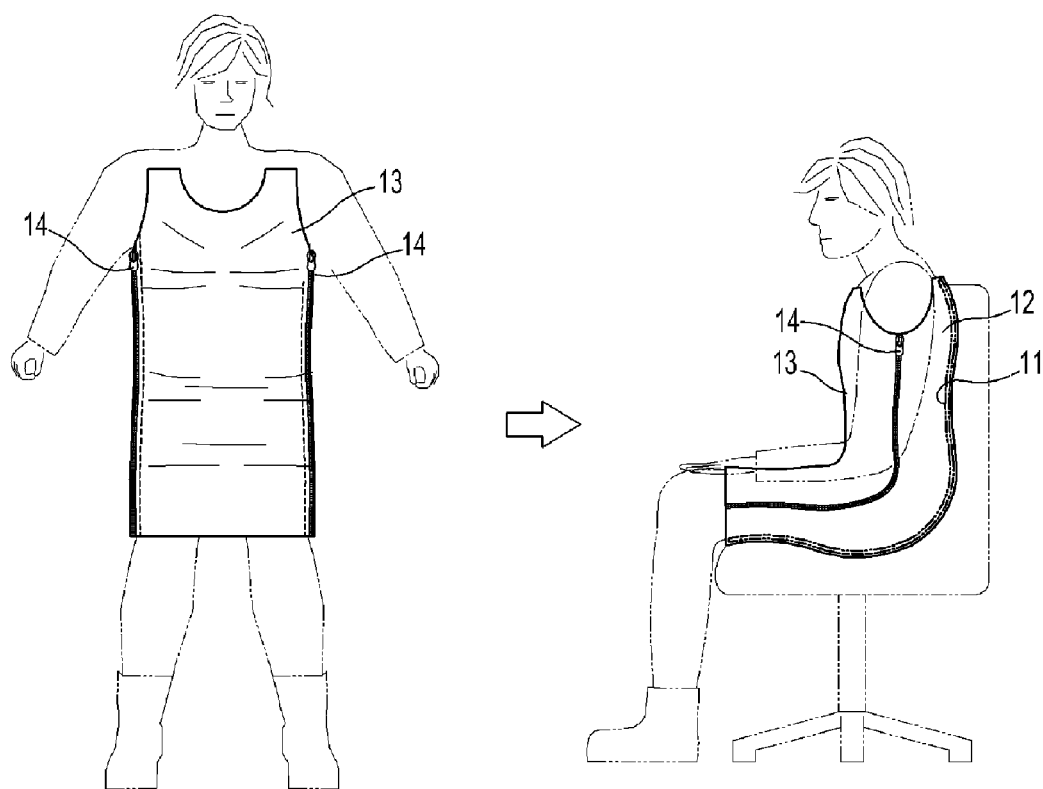

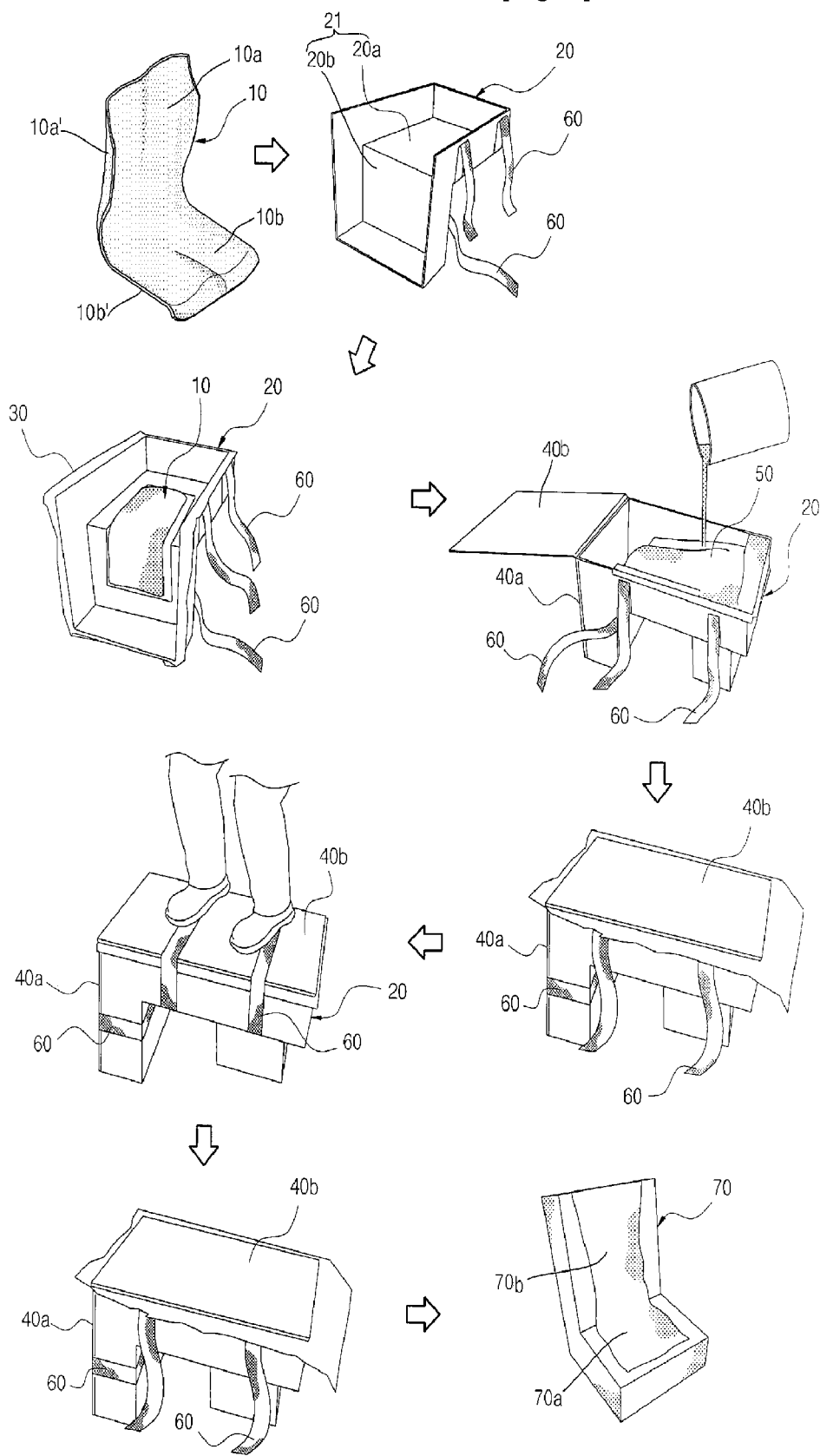
[Fig. 3]

METHOD OF MANUFACTURING A BACK PLATE AND A SEAT PLATE AND A WHEELCHAIR HAVING THE SAME

CROSS-REFERENCE TO RELATED APPLICATIONS

This application is a U.S. National Phase application, under 35 U.S.C. §371, of International Application no. PCT/KR07000286, with an international filing date of Jan. 17, 2007 and claims priority to Korean application no. 10-2006-0013685 filed on Feb. 13, 2006 and Korean application no. 10-2006-0132759 filed on Dec. 22, 2006; all of which are hereby incorporated by reference.

BACKGROUND OF THE INVENTION

1. Field of Invention

The present invention relates to a wheelchair having a back plate and a seat plate and a manufacturing method thereof, and more particularly, to a customized wheelchair having a back plate and a seat plate formed to fit a body shape and a manufacturing method thereof.

2. Background Art

A wheelchair is defined as a chair having wheels and used mobility-impaired people. The wheelchair includes front wheels at a front portion of a frame and rear wheels at a rear portion thereof. The frame includes a seat plate that supports the hip of a user, a back plate that supports the back of the user, and a foot plate that supports the feet of the user.

In recent years, the customized wheelchair having the back plate and the seat plate is developed to avoid changes and deterioration in body shapes of the mobility-impaired people who suffer from cerebral palsy or spinal paralysis and thus spend their everyday lives while seated in a chair.

In particular, when people who suffer from severe physical disability and thus spend their everyday lives in a chair, they may slide or fall down from a wheelchair due to unstable postures. Moreover, in many cases, their spine portions may be severely deformed due to an askew posture. Therefore, for a person who sits on a chair and thus needs others' help, there is a desperate demand for a customized wheelchair having a back plate and a seat plate.

The present invention provides such a customized wheelchair designed to fit a body shape.

A conventional method of manufacturing a back plate and a seat plate in a customized wheelchair designed to fit a body shape includes steps of: measuring a body size of a user seated in a chair; writing a specific detail of the user while measuring; performing a fitting operation in which the back plate and the seat plate are selected to constitute the chair for the user, and then the back plate and the seat plate are repeatedly carved by using various tools while the user is seated on the chair until the back plate and the seat plate exactly fit to the hip and the back of the user.

However, in the conventional method, in order to fit the body shape of the user, the back plate and the seat plate are manually carved by estimating the body shape of the user instead of directly performing a molding process by using an actual body shape of the user. Therefore, it is difficult to manufacture the back plate and the seat plate exactly fitted to the body shape of the user. In addition, since a high technique is required, the quality of the back plate and the seat plate has to depend on an operator's skill. However, even a job is done by the skillful operator, the job depends on eye measurement. Therefore, it has been impossible to manufacture the back plate and the seat plate exactly fitted to the body shape of the user.

Furthermore, since the manufacturing is manually carried out by the operator, there is a limit in a workload. In addition, an actual manufacturing time is required more than about one week. Accordingly, there has been a problem in that a significantly long time is required in manufacturing.

In particular, whenever the fitting operation is repeated, the user has to repeatedly seat on the chair, which is a very hard task for the mobility-impaired people.

Meanwhile, recently, in order to solve these problems, a method of manufacturing the back plate and the seat plate by using a computer has been proposed.

That is, a method has been proposed in which a body shape is scanned by using a scanner connected to a computer while the user is seated, and thereafter a material that forms the back plate and the seat plate by using information obtained from scanning is carved so that the back plate and the seat plate are formed to fit the body shape of the user.

However, when the computer is used as described above, equipment itself is expensive (more than 300 thousand US dollar). Moreover, it is difficult to fully aware a technique for operating the equipment. Therefore, at present, the method has not been put to practical use.

SUMMARY OF THE INVENTION

Technical Problem

The present invention provides a customized wheelchair having a back plate and a seat plate which are designed to fit the shapes of the hip and the back of a user, and a manufacturing method thereof.

The present invention also provides a customized wheelchair easily and rapidly manufactured in an ordinary skill without having to use expensive equipment, and a manufacturing method thereof.

Technical Solution

According to an aspect of the present invention, there is provided a method of manufacturing a customized wheelchair having a back plate and a seat plate which are designed to fit a body shape, the method comprising steps of: forming a preliminary molding material which is directly formed to fit a back and a hip of a user; fixing the preliminary molding material to a molding frame; filling a foaming resin in the molding frame fixed with the preliminary molding material; hardening the foaming resin filled in the molding frame; and releasing a last molding material which is foamed and hardened to have a shape of the back and the hip of the user by the preliminary molding material.

In the aforementioned aspect of the present invention, the preliminary molding material may be constructed with a double-folded sheet filled with a rigid polyurethane material.

In addition, the step of forming the preliminary molding material may comprise steps of: wearing a rear sheet, which is formed in the double-folded sheet filled with the rigid polyurethane to have a uniform thickness and is clothed at a rear portion including the back and the hip of the user, and a front sheet which is joined to the rear sheet while being clothed at a front portion of the user so that the front sheet is fixed to the user; and hardening the rigid polyurethane for a predetermined time in a state that the user closed with the front sheet and the rear sheet is seated on a chair having a back support.

In addition, the foaming resin may be made such that a foaming material is added to a flexible polyurethane material that can easily control rigidity and density.

BRIEF DESCRIPTION OF DRAWINGS

FIG. 1 is a flowchart illustrating a method of manufacturing a back plate and a seat plate designed to fit a body shape and included in a customized wheelchair according to an embodiment of the present invention;

FIG. 2 is a schematic view for explaining a preliminary molding material according to an embodiment of the present invention; and FIG. 3 is a schematic view for explaining a method of manufacturing a customized wheelchair having a back plate and a seat plate designed to fit a body shape according to an embodiment of the present invention.

DETAILED DESCRIPTION OF SPECIFIC EMBODIMENTS

Hereinafter, the present invention will be described in detail with reference to the accompanying drawings.

FIG. 1 is a flowchart illustrating a method of manufacturing a customized wheelchair according to an embodiment of the present invention. FIG. 2 is a schematic view for explaining a preliminary molding material according to an embodiment of the present invention. FIG. 3 is a schematic view for explaining a method of manufacturing a customized wheelchair having a back plate and a seat plate designed to fit a body shape according to an embodiment of the present invention.

Referring to FIG. 1, a method of manufacturing a back plate and a seat plate which are designed to fit a body shape of the present invention includes a step S1 in which a preliminary molding material directly formed according to the hip and the back of the user is manufactured, a step S2 in which the preliminary molding material is fixed to a molding frame, a step S3 in which a foaming resin is injected in the molding frame for foaming and hardening operations, and step S4 in which the foaming resin (last molding material) hardened to be the preliminary mold material is taken out of the molding frame.

First, in step S1 for manufacturing the preliminary molding material, as shown in FIG. 2, a preliminary molding material 10 is made of a rigid polyurethane 11 and a double-folded rear sheet 12 which is filled with the rigid type polyurethane 11 and is clothed at a rear portion of the user.

A front sheet 13 is joined with the rear sheet 12 and is clothed in a front portion of the user to fasten the rear sheet 12 to a user's body in a state that the rear sheet 12 is clothed in the user's body.

The rear sheet 12 and the front sheet 13 substantially have rectangular shapes. Preferably, the rear sheets 12 and the front sheet 13 are made of a cotton fabric material to provide comfortable wearing feeling.

Specifically, in an overlapped condition, an opening portion 10c of the double-folded rear sheet 12 is formed so that a portion of one edge thereof is open, and the other edge thereof is closed. The rigid polyurethane 11 having a specific viscosity is inserted into the opening portion 10c and is filled in the double-folded rear sheet 12. One entire surface of the rear sheet 12 is scrubbed by using a roller or the like so that the rigid polyurethane 11 is uniformly spread into the rear sheet 12 to form a uniform thickness as a whole.

After 5 to 10 minutes elapse, when the rigid polyurethane 11 filled in the double-folded rear sheet 12 to have a uniform thickness is hardened to some extent, this is clothed to a user who poses a direct standing posture and is thereafter further hardened for 20 to 30 minutes in a state that the user is seated on a chair. Then, the rigid polyurethane 11 is solidified to form the rear sheet 12 so that its outer look has the 'L' shape which is the same shape as the back and the hip of the user. The rear sheet 12 is released from the user so as to mold a preliminary molding material 10. In the 'L' shaped preliminary molding material 10, a hip 10b of the user is molded in a short end 10b' and a back 10b of the user is molded in a long end 10a'.

The front sheet 13 is not designed to fit the body shape of the user but to fix the rear sheet 12 to the user's body. Thus, the front sheet 13 is made of only a cotton fabric material without having to fill the rigid polyurethane 11.

To facilitate attaching and detaching operations between the rear sheet 12 and the front sheet 13, zippers 14 are respectively disposed at both sides of the front sheet 13 and the rear sheet 12. However, elements for attaching and detaching the front sheet 13 and the rear sheet 12 are not limited to the zippers 14, and thus any elements may be used as long as they can be easily contrived by those ordinary skilled in that art. For example, the zippers 14 may be replaced with buttons, pins, Velcro tapes, and so on.

Next, as described above, in step S2 in which the preliminary molding material 10 is fixed to a molding frame 20, as shown in FIG. 3, an upper portion and one side of the molding frame 20 are open. A mounting portion 21 having a cross-section in the shape of '⌐' is formed inside thereof so that the preliminary molding material 10 (a rear sheet formed to fit the back and the hip of the user) in the 'L' shape is mounted to be fixed in a turned-over state (that is, a portion formed to fit the back and the hip is downwardly directed). The preliminary molding material 10 may be fixed to the mounting portion 21 by using a well-known method of using an adhesive agent such as an adhesive tape.

The structure of a molding frame 20 will now be described in a greater detail. The mounting portion 21 formed in the molding frame 20 includes: a vertical portion 20b which comes in contact with the short end 10b' of the preliminary molding material 10 formed to fit the hip of the user; and a horizontal portion 20a which comes in contact with the long end 10a' of the preliminary molding material 10 formed to fit the back of the user. In addition, the inside of the molding frame 20 is provided with a filling portion where a specific space is formed at the front portion of the vertical portion 20b and the upper portion of the horizontal portion 20a so that a foaming resin 50 can be filled therein.

A lateral opening portion of the molding frame 20 is formed at a lateral side of the front portion of the vertical portion 20b. The lateral opening portion is provided with a lateral cover 40a to cover the later opening portion so that the filling portion can be formed before the foaming resin 50 is inserted.

The upper opening portion of the molding frame 20 is provided with an upper cover 40b to cover the upper opening portion after the foaming resin 50 is inserted.

The molding frame 20 may be made of metal, wood, plastic, and so on. The molding frame 20 can be repeatedly used.

Next, in step S3 in which the foaming resin 50 is inserted inside the molding frame 20 for foaming and hardening operations, a flexible polyurethane is used for the foaming resin 50, wherein the flexible polyurethane can control density and rigidity so that a hardened last molding material 70 can maintain a cushion property to some extent. Prior to the insertion of the flexible polyurethane 50, in order to facilitate release of the last molding material 70 from the molding frame 20, a release agent (not shown) such as silicon resin, paraffin, and wax is coated on the inner surfaces of the preliminary molding material 10 and the molding frame 20. Alternatively, a release paper 30 such as a newspaper or a general paper is attached.

A method of manufacturing a customized wheelchair of the present invention will now be described in a greater detail.

As shown in FIGS. 2 and 3, the rigid polyurethane 11 is inserted through the opening portion 10c formed at one edge of the double-folded rear sheet 12. Thereafter, an entire surface of the rear sheet 12 is evenly scrubbed by using a roller or the like so that the rigid polyurethane 11 is uniformly filled in the double-folded rear sheet 12, thereby manufacturing the rear sheet 12 having a uniform thickness. Thereafter, a hardening operation is performed for about 5 to 10 minutes.

Preferably, in this case, a sufficient amount of the rigid polyurethane 11 is inserted to have a suitable thickness so that an inner surface curve formed to fit the back and the hip of the user can be viewed to have the same shape as that formed on an outer surface. Specifically, it is preferable that the rigid polyurethane 11 uniformly filled in the double-folded rear sheet 12 has a thickness of about 0.8 mm to 1.3 mm.

Next, when the rigid polyurethane 11 filled in the gap of the rear sheet 12 is hardened to some extent and thus becomes soft, the front sheet 13 and the rear sheet 12 are both clothed to the user who poses in a directly standing posture. Thereafter, the front sheet 13 and the rear sheet 12 are attached to each other by using the zippers 14 provided at both side thereof. The rear sheet 12 clothed to the user's body is tightly pressed towards the user's body by using a hand or the like.

In a state that the rear sheet 12 is closely in contact with the user's body, the user is seated on a chair having a back support. Then, in a state that the back and the hip of the user are pressed towards the chair, a hardening process is further performed for about 20 to 30 minutes.

Next, when the rigid polyurethane 11 filled in the gap of the rear sheet 12 is completely hardened and solidified, the zippers 14 fastening the front sheet 11 and the rear sheet 12 are open, and the front sheet 11 and the rear sheet 12 are released from the user's body.

Among the released sheets, only the rear sheet 12 formed to fit the back and the hip of the user is used as the preliminary molding material 10.

Next, the upper cover 40b and the lateral cover 40a of the box shaped molding frame 20 are open. Then, according to a '⌐' shaped bending portion of the mounting portion 21 formed in the molding frame 20, the preliminary molding material 10 having the 'L' shape and formed to fit the back and the hip of the user is mounted so that the short end 10b' of the preliminary molding material 10 formed to fit the bottom comes in contact with the vertical portion 20b of the mounting portion 21, and the long end 10a' of the preliminary molding material 10 formed to fit the back comes in contact with the horizontal portion 20a of the mounting portion 21.

As described above, after the preliminary molding material 10 is mounted on the mounting portion 21, the entire surface of the preliminary molding material 10 is strongly fixed inside the molding frame 20 by using an adhesive agent (not shown) such as an adhesive tape.

Next, the release agent is uniformly coated on the inner surfaces of the preliminary molding material 10 and the molding frame 20. Alternatively, the release paper 30 is attached thereon.

Next, when the preliminary molding material 10 is completely fixed to the inner portion of the molding frame 20, the lateral opening portion is covered with the lateral cover 40a. Then, a flexible polyurethane that is the foaming resin 50 is filled in the molding frame 20 through the upper opening portion. After the flexible polyurethane is filled in the molding frame 20, the upper cover 40b is closed to finish the upper opening portion.

In this case, in order to prevent the flexible polyurethane from flowing out of the molding frame 20 during foaming, the upper cover 40b and the lateral cover 40b are strongly bonded and fixed by using a band 60.

In addition, in order to prevent the foamed polyurethane from flowing out of the molding frame 20, it is preferable that an operator steps on the upper cover 40b or puts a heavy object on the upper surface of the upper cover 40b.

In this case, an insertion amount of the flexible polyurethane is preferably as $1/11$ to $1/14$ times as an internal capacity of the molding frame 20 in consideration of a foaming amount.

When about 30 minutes elapses after the flexible polyurethane is inserted, in the process of foaming and hardening, the flexible polyurethane is hardened to have the same shape as the back and the hip of the user from the preliminary molding material 10 formed to fit the back and the hip of the user, thereby forming the last molding material 70.

Next, the last molding material 70 is taken out of the molding frame 20.

A back plate 70b and a seat plate 70a of the last molding material 70 which are formed to have the same shape as the back and the hip of the user result in a shape in which a physical feature of the user is maintained without alternation. If necessary, a finishing operation is performed to some extent.

Next, the user's body undergoes the fitting operation. After the fitting operation is normally performed, an operation for covering with an outer cover or an operation for mounting an auxiliary part are performed. Then, the last molding material 70 is fastened to the frame of the wheelchair, thereby completing a manufacturing of a customized wheelchair of the present invention.

While the present invention has been particularly shown and described with reference to exemplary embodiments thereof, it will be understood by those skilled in the art that various changes in form and details may be made therein without departing from the spirit and scope of the present invention as defined by the appended claims.

INDUSTRIAL APPLICABILITY

Accordingly, a back plate and a seat plate equipped in a customized wheelchair of the present invention are formed to fit a body shape of a user. Therefore, it is possible to restore the exactly same shape as the back and the hip of the user. As a result, mobility-impaired people suffering from cerebral palsy or spinal paralysis can do their everyday lives while seated in a wheelchair in a stable posture, thereby preventing deformation of a body shape such as a spine shape and a pelvis shape. Furthermore, additional deformation can be prevented for a user having a deformed spine.

In addition, since the back plate and the seat plate equipped in the customized wheelchair of the present invention are not required of a skilled technique in manufacturing, the back plate and the seat plate can be easily manufactured by those ordinary skilled in the art. Furthermore, since foaming and hardening operations of polyurethane are performed only twice instead of performing a process in which a carving operation is repeated while the user is seated. Therefore, a manufacturing time is required about 1 to 2 days, significantly reduced by 4 to 5 days from a conventional case that requires a manufacturing time of about 1 to 2 weeks.

In addition, it is possible to restore the exactly same shape as the back and the hip of the user without having to use expensive equipment. Therefore, there is an advantage in that manufacturing and selling can be achieved in a cost effective manner.

I claim:

1. A method of manufacturing a customized wheelchair having a back plate and a seat plate which are designed to fit a body shape, the method comprising steps of:
   forming a preliminary molding material which is directly formed to fit a back and a hip of a user, wherein the step of forming the preliminary molding material comprises the steps of:
      wearing a rear sheet, which is formed in a double-folded sheet filled with a rigid polyurethane to have a uniform thickness and is clothed at a rear portion including the back and the hip of the user, and a front sheet which is joined to the rear sheet while being clothed at a front portion of the user so that the front sheet is fixed to the user; and
      hardening the rigid polyurethane for a predetermined time in a state that the user enclosed within the front sheet and the rear sheet is seated on a chair having a back support,
         such that the preliminary molding material of rigid polyurethane that is hardened has a resulting inner surface and an outer surface in the same shape;
   fixing the preliminary molding material of the rear sheet, that has the rigid polyurethane hardened, to a molding frame shaped into the back plate and the seat plate of the wheelchair;
   filling a flexible polyurethane in the molding frame fixed with the preliminary molding material;
   hardening the flexible polyurethane filled in the molding frame; and
   releasing a last molding material, from the molding frame, which is foamed and hardened to have a shape of the back and the hip of the user by the direct form of the preliminary molding material.

2. The method according to claim 1, wherein the front sheet and the rear sheets are made of a cotton fabric material to offer a comfortable wearing feeling.

3. The method according to any one of claims 1 or 2, wherein the foaming resin is made such that a foaming material is added to a flexible polyurethane material that can easily control rigidity and density.

4. The method according to claim 1, wherein the flexible polyurethane is inserted as 1/11 to 1/14 times as an internal capacity of the molding frame.

5. The method according to claim 1, further comprising a finish step in which an outer cover is coated in the last molding material after the last molding material is released.

6. The method according to claim 1, wherein the rear sheet is joined to the front sheet by a zipper.

7. A method of manufacturing a back plate and a seat plate designed to fit a user's body, the method comprising the steps:
   creating a body mold having a configuration that is generally duplicative of a configuration of a user's back area and hip area, wherein creating a body mold includes the steps:
      providing a sheet having first and second layers and a rigid polyurethane of generally uniform thickness sandwiched between the first and second layers;
      coupling the sheet to a user's body to abut the user's back area and hip area;
      placing the user in a sitting position;
      hardening the rigid polyurethane in the sheet while the user is in the sitting position; and
      separating the sheet from the user's body; and
   introducing a molding material to the body mold and fixing the molding material to have a permanent configuration that is generally complementary to the body mold and the user's back and hip areas, wherein introducing a molding material to the body mold includes the steps:
      providing a molding frame configured to receive the body mold;
      placing the body mold in the molding frame whereby an area is defined between the body mold and the molding frame; and
      adding the molding material such that the molding material is entirely encompassed by the body mold and the molding frame and the molding material fills the entire area defined between the body mold and the molding frame.

8. A method of manufacturing a wheelchair having a back plate and a seat plate designed to fit a user's body, the method comprising the steps:
   creating a body mold having a configuration that is generally duplicative of a configuration of a user's back area and hip area, wherein creating a body mold includes the steps:
      providing a sheet having first and second layers and a rigid polyurethane of generally uniform thickness sandwiched between the first and second layers;
      coupling the sheet to a user's body to abut the user's back area and hip area;
   placing the user in a sitting position;
      hardening the rigid polyurethane in the sheet while the user is in the sitting position; and
      separating the sheet from the user's body;
   introducing a molding material to the body mold and fixing the molding material to have a permanent configuration that is generally complementary to the body mold and the user's back and hip areas, wherein introducing a molding material to the body mold includes the steps:
      providing a molding frame configured to receive the body mold;
      placing the body mold in the molding frame whereby an area is defined between the body mold and the molding frame; and
      adding the molding material such that the molding material is entirely encompassed by the body mold and the molding frame and the molding material fills the entire area defined between the body mold and the molding frame; and
   coupling the permanently configured molding material to a wheelchair.

* * * * *